US008439290B2

(12) United States Patent
Trell et al.

(10) Patent No.: US 8,439,290 B2
(45) Date of Patent: May 14, 2013

(54) METHOD AND DEVICE TO CONTROL CERTAIN FUNCTIONING OF A MULTIPLIER/BAIT CASTING REEL

(75) Inventors: Anders Edward Trell, Stockholm (SE); Shrikant Chandrakant Pathak, Pune (IN)

(73) Assignee: Anders Trell Trust, Buffalo, NY (US)

( * ) Notice: Subject to any disclaimer, the term of this patent is extended or adjusted under 35 U.S.C. 154(b) by 808 days.

(21) Appl. No.: 12/448,902

(22) PCT Filed: Jan. 2, 2008

(86) PCT No.: PCT/SE2008/000006
§ 371 (c)(1),
(2), (4) Date: Jul. 15, 2009

(87) PCT Pub. No.: WO2008/091189
PCT Pub. Date: Jul. 31, 2008

(65) Prior Publication Data
US 2010/0170977 A1    Jul. 8, 2010

Related U.S. Application Data

(60) Provisional application No. 60/905,889, filed on Mar. 9, 2007.

(30) Foreign Application Priority Data

Jan. 23, 2007    (SE) ...................................... 0700147

(51) Int. Cl.
*A01K 89/01*    (2006.01)
(52) U.S. Cl.
USPC .......................................... 242/223; 242/224

(58) Field of Classification Search ............... 242/223, 242/224
See application file for complete search history.

(56) References Cited

U.S. PATENT DOCUMENTS

| 4,037,326 | A | * | 7/1977 | Booth et al. ...................... 33/756 |
| 4,402,470 | A | * | 9/1983 | Hamayasu ..................... 242/286 |
| 4,438,391 | A | * | 3/1984 | Rog et al. ..................... 324/71.1 |
| 5,395,065 | A | * | 3/1995 | Hirose .......................... 242/223 |
| 5,427,323 | A | * | 6/1995 | Kaneko et al. ................. 242/223 |
| 5,577,679 | A |   | 11/1996 | Thomas ........................ 242/286 |
| 5,833,156 | A |   | 11/1998 | Park et al. ..................... 242/289 |
| 6,045,067 | A |   | 4/2000 | Foster ............................ 239/754 |
| 6,253,461 | B1 | * | 7/2001 | Fischer ........................... 33/762 |
| 6,412,722 | B1 |   | 7/2002 | Kreuser et al. |
| 6,973,999 | B2 |   | 12/2005 | Ikuta et al. |
| 6,983,907 | B2 |   | 1/2006 | Ikuta et al. .................... 242/288 |
| 7,113,166 | B1 | * | 9/2006 | Rosenberg et al. ........... 345/156 |
| 7,188,793 | B2 | * | 3/2007 | Ikuta et al. .................... 242/223 |
| 7,784,724 | B2 | * | 8/2010 | Beckham ..................... 242/223 |

* cited by examiner

FOREIGN PATENT DOCUMENTS
WO    WO 2006-081509    8/2006

OTHER PUBLICATIONS
International Search Report dated May 15, 2008.

*Primary Examiner* — Emmanuel M Marcelo
(74) *Attorney, Agent, or Firm* — Jacobson Holman PLLC

(57) ABSTRACT

A method and a device for computer-aided regulation of rotational speed of a reel spool, when paying out (and reeling in) an on-wound line. The line surface is surveyed by digital imaging and/or an electronic distance measuring device; and incidents of line rising from the spool are captured and reported to an on-board computer which, proportionally to such input, orders variable engaging/releasing of braking force to the brake(s) of the reel to avert backlash.

15 Claims, 2 Drawing Sheets

METHOD AND DEVICE TO CONTROL CERTAIN FUNCTIONING OF A MULTIPLIER/BAIT CASTING REEL

This is a national stage of PCT/SE08/000,006 filed Jan. 2, 2008 and published in English, which has a priority of Swedish patent application no. 0700147-2 filed Jan. 23, 2007 and U.S. patent application No. 60/905,889 filed Mar. 9, 2007, hereby incorporated by reference.

FIELD OF THE INVENTION

The present invention relates, according to a first and second aspect, to a method and a device to control certain functioning of a multiplier/bait casting reel.

According to a third aspect, the present invention relates to at least one computer software product for controlling certain functioning of a multiplier/bait casting reel.

BACKGROUND OF THE INVENTION

In sport fishing the multiplier/bait casting reel (hereinafter "reel") concept is well established. Certain current drawbacks, though, tempt anglers to often prefer spinning reels, especially when using light baits. The main aim of a cast is to reach the fish, often at long distance. This in turn takes great initial speed of the bait so it can reach, bringing the line along. Especially when light baits are used, air resistance, wind, sudden gusts, friction etc., quite fast and at times retards (and at cast end stops) a light bait's speed, while the reel spool, due to its initially given high momentum and inertia keeps its speed longer and more steady, and thus has to be timely actively braked, so the line on the spool shall not expand and entangle—"backlash". By expert casters such braking is often done by the thumb on the spool, which takes experience, but is flexible and optimal in that spool speed can be instantly lowered just to prevent entangling, and then released so as not to put extra and continuous brake to the spool's rotation and thus speed of the pulling bait. Such expertness is however not with all anglers; and thus mechanical cast brakes have been devised, well known in the art, which mostly work by friction and/or magnetism, sometimes centrifugally effected. As is also known, this lacks the flexibility and instantaneousness of expert thumb control, so it cannot always eliminate backlash and will likely constantly apply a speed damping effect on the bait itself, so, especially when using light baits, cast length is restrained; and which all has led to mentioned preference for spinning reels, even though these may not "control" a fish so well and can twine the line after some fish "rushes" when the spool slip-rotates—"drags".

There is lot of prior art aiming at solving this backlash problem, some all mechanical like U.S. Pat. No. 6,109,555, and some making use of computers like (a) U.S. Pat. No. 5,577,679; (b) U.S. Pat. No. 5,833,156; (c) U.S. Pat. No. 6,045,067; (d) U.S. Pat. No. 6,412,722; (e) U.S. Pat. No. 6,973,999; and (f) U.S. Pat. No. 6,983,907. As appreciated by all these latter, a computer is really an ideal device in this context, but if its input is inadequate, its output (result) will be imperfect. All make some use of rotation sensors, RPM, and match it with speed of the line, sensed by spots thereon and/or measuring of line-on-spool radius (a, b, c); various means (c) and tension of the line, determined by slope of the line (a, b), mechanically sensed (c, d, e, f) and/or calculated (e, f). Additionally, c, d, e and f also put a strong short, preventing brake pulse at or 'just before' maximum spool rotation speed; and (c) suggests detection of variable amount of light from an axial photo-emitter reaching a photo-detector after being reflected or absorbed by strands of rising line for assuming overrun.

Without going into detail, it seems that all of the above fail to give their employed computer apt real-time information to perfectly solve the backlash problem. Specifically re line tension, one problem is that the line tension is naught also when line and spool speed match. If that be the case, it can thus not be differentiated (since the line can not induce any perceptible "push", only "pull", and "slope" outside the reel seems inapt and too late) from an overrun condition and thus, if brake is applied assuming overrun, unnecessary braking may occur. By mathematics, (e) and (f) aim at solving this problem, but nevertheless a number of preset "patterns" are there in forehand selectable for different assumed/expected conditions to, off real-time, optimize the cast and forestall a backlash.

A backlash cannot however be fully predicted; it can occur anytime during a cast depending on varying and sometimes totally unexpected and sudden conditions/events that have to be met totally in real-time and not more or less preset. The parrying initial short brake "pulse" of ref. c, d, e and f, though, points out that the very onset of a cast is a common occasion, and which is also well recognized by the experienced "thumb-beaker" mentioned, who generally can handle this phase of a cast quite well, not normally then having to react to unexpected sudden incidents.

When the bait is released, it goes out instantly with full speed and the spool must go from total stand-still to maximum speed momentarily. This gives a snatch, actually giving spool a considerable over-speed (line is unstretchable, and tense since release is from the reel) at start. At the same time, the bait must surrender a fraction of its kinetic energy, the now only available energy of the system, to set the spool in motion, which moderates the snatch a bit, but also instantly reduces bait speed. In all, already from start there is a mismatch state in the cast. Furthermore, the diameter of line-on-spool is here at maximum, so distance to reel structures likely triggering entanglement if touched is minimal; hence this phase of a cast is really critical and also very fast. All this is expected by the (experienced) thumb-braker, who just has to supervise the (normal—if unexpected things, like bait hitting something, occur, human reaction time before taking apt remedying measures is far too long) course reflexively and thus immediately can apply, adjust and release the thumb-pressure to obtain the just enough brake. A mentioned automatic brake "pulse" in this phase, may be too strong, reducing cast length; or too weak, possibly leading to backlash and cannot alone avert sudden incidents; and the above-mentioned prior art assisting measures don't appear to be enough fast, susceptible and/or exact.

If the onset phase is successfully equalized and cast proceeds normally, probability of backlash is smaller, so initially mentioned "constant" braking methods are over-kills. One retarding factor even absent friction and these brakes, though, is the fact that spool-diameter reduces as cast proceeds, so if bait speed is to remain constant, spool rotation must increase. Absent some servo motoring this inevitably works like a de facto brake and reduces backlash probability. Also, distance to reel structures that might entangle if touched is gradually increasing, reducing backlash risk. Nevertheless, unforeseen and sudden backlash due to various mostly external and/or extraordinary factors (wind, friction, object-hits etc.) can occur also here, which has to be instantly and aptly attended to, and for which many more or less hypothetic and preset brake actions/patterns (or human reaction time) may not suffice.

The courses are very speedy here, which favors a computer employment, but input must be swift, apt and totally in real-time. So how does a backlash manifest itself? Whatever the underlying course, a backlash occurs when line expanding from the spool, due to the latter's over-speed touches the frame or other structures of the reel and cannot expand any more but becomes entangled. So build-up of line-diameter on spool is unambiguously indicative, qualitatively and quantitatively, of emerging backlash, whatever the occasioning spool rotation and line speed etc. happen to be. But it has to be properly and immediately sensed and evaluated in both quality and quantity in both time and size axis, to be of use as input to a computer, allowing same to take proper corrective measures in both strength and time.

OBJECT OF THE INVENTION

It is an object of the present invention to overcome such as above disadvantages and to apply cast brake—and additionally also other optional controlling/assisting functions—flexibly, prompt and with just the grade and period needed for the actual situation; to achieve this by correct in-run information pick up, supervising and steering of the designated functions, by a preferably embedded micro-computer, aka—processor/-controller; and, by providing the computer with apt input means, such as monitoring sensors, and apt corresponding output control means, such as brakes/drags, to do so in real-time, and not, where no or not sensitive/swift enough input means are present, just as pre-assigned computer-settings for mostly afore-adjusting cast braking to various presumed situations and projected results, as is now i. a. known in the art.

Another object of the present invention is to forestall and/or prevent, in addition to such as above disadvantages, also calamities like loss of line, which apart from a maybe spoilt fishing trip is a considerable environmental injury and cruelty to a fish still on the hook; and to achieve this by collecting relevant data also under the winding in phase and record them, facilitating for the computer to based on such material and by program correctly predict and/or in an ensuing cast warn for/interrupt such emergencies.

Yet another object of this invention is to solve such as above-mentioned problems by at least one computer software product.

DESCRIPTION OF PREFERRED EMBODIMENTS

Figure 1:
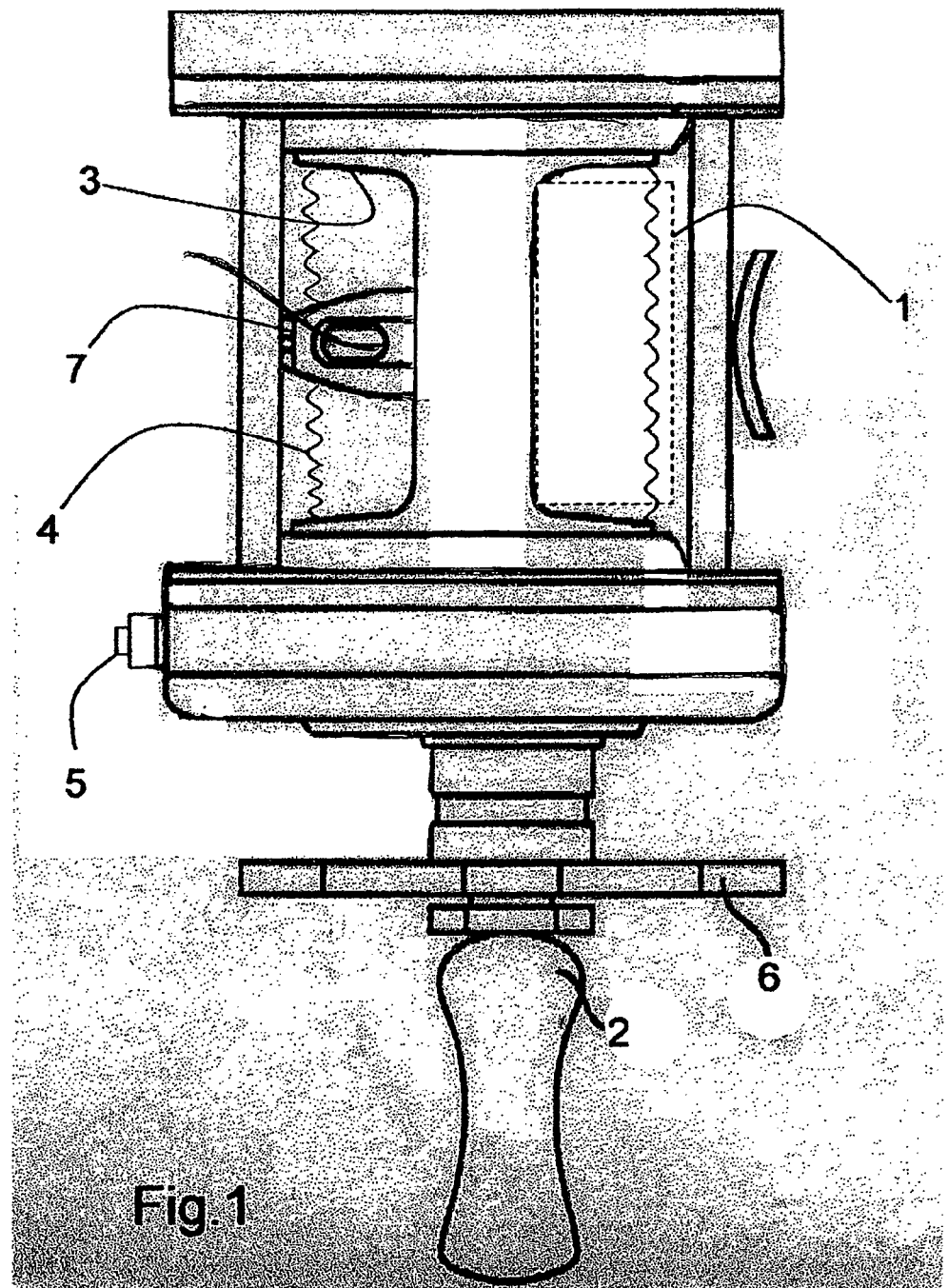
FIG. 1 shows by means of reference only a simplified side view of a standard multiplier/bait casting reel where only the features more specifically referred to in description and claims are being indicated.

To effect backlash-preventing cast brake according to this invention, a line expansion (and set, so the computer can reduce or abandon braking upon settling an incident) sensor is first devised, giving immediate and unequivocal grade input in this respect to the computer; and for this can be (and has, as above discussed, been) tried a (calculated or) physical sensor on e.g. the spool shaft noting if there is any line pull, which however may be too dull for noting the rapid small changes here actual; or a touch sensitive bar or thread across the reel frame near its periphery, sensing line approach but which might come too late and in itself cause entangling when touched; or a line speed/tension spool-RPM/diameter computation; or varying amounts of light presumed to be caused by rising line strands for estimating line rise due to overrun; all however with no proved good record for really eliminating backlash.

It is now realized by this invention that a possible solution could be to from an elevated position (outside or inside the reel) measure the distance to the spool's (with line) surface at start of cast, and then monitoring it through the cast, noting and proportionally reacting to critically lessening distance, in signaling to the computer any tendency or condition of line (or strands thereof) expansion, being then indicative of spool over-speed. Electronic distance measuring techniques and components are to-day well known and proved, small and low-cost as with auto-focus cameras and ultra-sound/laser distance meters, or expensive as with acoustical holography, and may thus here provide the computer with adequate input for by application program swiftly taking proper braking action; however, they are deemed yet either not fast/exact or budget enough to at reasonable cost fully cope with the speed and delicacy here actual, but included in the inventive thought for possible employing once they in the course of technical development might be.

It is ultimately here realized that, being very accurate, detailed and specific, and thus preferred, digital photographic procedure and means be applied as input sensor to the computer. "Photographic" is here taken in a broader meaning, thus that the taken "pictures" (or images) are used just as input to the computer and not for film/photos etc. They don't then have to be of film/photo quality, color etc., but detailed enough and formatted for proper input to the computer and its task. A rudimentary photographic application then, is a blinking barcode reader version at e.g. pay-counters. For every blink a picture is fed to the controlling computer, and so when a bar-coded object is moved in front, a sequence of pictures is produced, enabling the computer to discern the barcode. Even modified and adapted for use with this invention, it would hardly be detailed and fast enough for the minute but fast courses here actual, so it is not preferred, but included in the present inventive thought.

A more progressed photographic (or rather, since no photos/films are made, imaging) application, is found in the so called optical (computer) mouse. In a such the surface underneath is photographed thousands of times per second. From how the pictures differ from each other, the position of the pointer is calculated. A so called lasermouse uses laser instead of LED to illuminate the image exposure, which makes it even faster since the monochromatic laser-light allows for greater detail and faster scanning (=exposure), so to-day a so called gamemouse can have groundspeed 54"/s, report rate of 9000 frames(images)/s, user-variable resolution between 800-3200 DPI (Dots[pixels] Per Inch) and senses/speed of 6.4 read-off Megapixels/s. This would be enough for the reading off and timely report of the few albeit delicate parameters of this invention, but some adaptive hardware steps are needed to be taken to size it into a small reel-house and/or by optical means allow it to take pictures from a distance; the methodological steps of this invention would remain, though, and instead of calculating the position of a pointer and move it there, the computer in the case of and by this invention, is enabled to take those corrective measures and steps it has been here programmed and equipped for.

A digital camera as we know it to-day, takes marvelous color photos but has less speed. It can take video sequences, but slow. It uses a more or less standard component, a so called picture (image) sensor of high resolution, from the input of which it builds up a picture with emphasis on photo quality, and then also displays it and stores it. All this takes time (although the exposure time per se can be short) and (execution) space, even if the sensor in itself is quick and also very small, being solid state. By optics and in so called macro mode, very near pictures can be taken. It is here put forward that one (or more) for this invention adapted such sensor chip(s) of adequate resolution; from which for this invention adequate and wanted data are extracted; provided with suitable optics and possibly in connection with game mouse speed etc. routines, would be an advantageous and one preferred sensor embodiment ("camera") of this invention.

When it comes to digital video cameras, so called camcorders, resolution, picture quality etc. is fine, but speed traditionally quite slow. They also use image sensor IC:s, CCD or CMOS, and with the latter and something called Enhanced Imaging Processor, newer versions can read and process four times as many frames per second than traditional ones, to capture rapid movements like a bird's wings in motion; but still likely too slow for the speed of some emerging backlash.

To phase off the catalog of presently more generally available devices utilizing image sensors for video capture and which, properly attached and supported by relevant application program, might be employed as sensors for this invention, one can mention WEB-cameras and, yes, (camera) cellphones, communicating with the reel computer e.g. by RF (e.g. Bluetooth), IR, other wireless or wired formats. It may also be noted that, without departing from the thought of this invention, some described elements can be placed outside of or being modular add-ons to the reel, yet methodologically remaining same. With the term/format photography as herein contemplated, also holographic imaging, whether by light or other wave forms, is meant included.

According to a preferred embodiment, the only sensing needed for backlash prevention, is a visual surveillance of the line on the spool at the onset and during a cast. This is actually what the thumb-braker does, successfully and by the rapid reflexive nerve system in the course of a normal and problem-free cast; only her/his reaction time to sudden unexpected (because heed was at spool) bait stops, (now all through the non reflexive nerve system) first having to be perceived, than through the brain for analysis and action decision, then through the nerves to the thumb, than actual (panic) thumb action, in all about 0.5-1 s, is far too long to hinder an ensuing backlash, which in case of a sudden bait stop in the beginning of a cast often becomes so entangled that it can take hours to untie and also then the line may be so dented that it cannot be further used. A computer provided with fast real-time input of just the line on the spool which in the onset of a cast normally is rather orderly and tight wound, has firstly no different response time for expected and unexpected things: it gets and processes the input and that's it; and secondly, its reaction time in either case is in microseconds (and further helped by that it will take some spool over-rotations to critically rise the line), enough for also having full control at onset of a cast, hence no need of a routine initial short brake pulse mentioned above.

According to the method of this invention and in a preferred embodiment, a moving picture (image/frame) capturing means, a (video/film) "camera" is attached to the reel, focusing on a relevant portion of the line about the spool. At start of a cast it can be usually trigged to reset and report images/frames to the computer (possibly in resolution, speed and/or laser illumination, of a game mouse), which report will go on all during the cast. The computer can then against the essentially static reference of an averagely thinning spool (kept in check), discern any dynamic events of expanding/setting/slacking line parts and by how thus the images differ from each other and its time reference also calculate the intensity; from which all it can spot in time and calculate a backlash-rise/set, which and how much rectifying measures (typically engage or release braking) to take and when to leave be, all under instructions by its operative program. From what hereinafter will be stated re general imaging processing ("imaging") means, terminology etc., will follow that the herein used expand/rise/set terms rather can be put as varying degree/direction of entropy.

Ways how to variably engage/release brake to a spool and how ordered by a computer are known in the art, and it is thus believed that much detailed disclosure thereof isn't here needed. It would though seem that engaging an electric generator means as brake agent is advantageous in that it can also power (esp. if engaged at winding in) i. a. the computer and/or charge an on-board battery. Brake can be normally 'on', release-controlled, or 'off', engage-controlled. Forestalling an 'explosive' early backlash at e.g. bait stop, a separate dead stop can be effectuated by the computer, which also may accept a user's input from e.g. a press-button (which may also serve as cast release/stop, and/or drag control when winding in) on the reel, for braking/engaging/releasing proportional to press when user wants to actively regulate a cast e.g. softer than by the crank (FIG. 1, 2), and/or the drag handier than by an ordinary drag control. For drag, the computer can have a separate output for customary steering e.g. a friction drag, and suggested user input organ can be joint since cast an winding-in situations differ.

It is thought (and preferred) that the best portion for the camera to overlook and focus on, is a horizontal, or axial, mid section of the spool with line wound on, plus the empty space there-between and the reel's framework, thus that it from an above position will view a full profile, or silhouette, of the line all the length of the spool plus the line's maximum "allowed" expansion field. Only one side of this section is needed, since there is symmetry and rotation; and also the reel's own spool width can be omitted (FIG. 1, 1). As long as it has an unobstructed view of the chosen portion, the camera can be placed out- or inside of the spool frame (also diagonally) where-ever it may suit best, possibly with wide-angle optics and in macro mode for placing near. Line to the computer can be corded or cordless. At start, image will look quite like a cylinder side (with desired/chosen top area portion) which will change and expand (entropy) when backlash builds. It may also become fuzzy and horizontally unsymmetrical, but camera will in adequate speed report all changes to the computer which, noting and quantifying them, can take back entropy of line before entangling, by putting/releasing brake in proportion to the intensity, thus restoring the cylinder shape. In the course of the cast the viewed cylinder should orderly thin and brake can be kept in off state, but rise tendency will still be seen, reported and muted. Laser, LED, UV, IR etc. light can be put to illuminate at need, and varied e.g. to adjust to outside light conditions. As well as steady focusing the area, scanning it is feasible.

Sensing of the spool's rotation speed, RPM, can give some extra and advantageous features, esp. since anyhow a computer is present which can receive, treat and integrate such parameters into the overall reel function. Although RPM in itself is not vital for the anti-backlash controlling as hereinabove disclosed, it can add enhancing detail and track of the entire tandem-run (from primarily empty spool, via winding on, casting and winding in line) of spool and line/bait. RPM-information can be delivered either from a separate sensor, or camera also registering e.g. a photo-able spot on the side periphery of the reel's spool. By computation of RPM and actual diameter of spool over time, speed, length, duration etc. of cast can be noted to possibly assist in the cast and can, if a display is added, all be given out to the user, possibly together with things like length/speed of fish rush (when spool drags) and of line turned in/remaining etc. Aided by such a display and input means where provided, the user may by some menu system also put in own data, such as clock/calendar setting, bait weight, line parameters, desired/repeated cast length etc. for wanted and for the situation optimal performance, PIN-code for authorization/personalizing of use, settings for above-mentioned "press-button" (computer override) option etc. Also, high RPM can prompt the camera/computer to "high alert" state. If camera has resolution enough, possibly also information of gauge, defects, slope/slack etc. of the line in use can be noted, for any use or display/alert. Also other existing or new functions of the reel can be controlled by the computer, which to-day generally is very capable of multi-tasking. As an example, it may also control light, optics, possibly zoom and focusing of camera for optimal detail, i. a. so spool can be sometimes allowed a little loosely wound state in cast, thus avoiding overly braking.

If also surveying the line being wound in and temporarily storing such data, a perfected reference static (but running along) background pattern and/or guide for next cast etc. can be provided, also capable of advance warning for enveloped problems, defects, disorders etc. For instance, cast/drag can be gently stopped, and/or warning can be given, just before spool runs out of line so possible line-loss is averted. Also, a so called level wind, taking care of orderly distribution of wound in line on the spool, can be supervised. Conventionally being in sync by gears etc. also during a cast, it constitutes a severe constant brake, esp. for cast by lighter baits. It may here be free-coupled and e.g. folded away much like the winding-in yoke on spinning reels upon casting, and then by gear or servo motor effective under computer control when winding in and at drag. By then being quite tight on the line, a certain tension, improving orderly distribution on the spool, can be maintained; and wiping off potentially disturbing water/dirt on the line may escort. If still camera optics gets soiled, it can be detected, compensated for, alert given and/or cast possibly subdued pending cleaning. It can also be noted that mentioned user available cast/drag control computer input means (e.g. press-button, but also to-day feasible and likely quite apt, voice commands) can be used as a cast training tool and/or by different levels of regulation depending on angler skill/preference, for enhancing fishing experience. However, computer could always be given the last word, to redress if control is lost (chaos).

Many components here are feasible at low cost and VLSI or available as standard components or modifications thereof, and no movable parts besides those that already a reel has are needed. Camera means has to be added and, for reels not already having such, a computer. In order for already computerized reels to make use of this invention, the herein disclosed method with its certain specific input means would have to be adopted (and some existing parts can remain). The computer itself can be custom or specially made, but as image processing concerns, preferably having capability to run image understanding and error correction algorithms (e.g. PID; recursive contextual/contextual image classification; active contour/hidden Markow model; pattern analysis; fuzzy rules/approximation; Fourier transformations) efficiently, which speaks in favor of a Digital Signal Processor, whereas what concerns control of the reel, an MCU would be OK; there is however also a hybrid there-in-between, single chip Digital Signal Controller available. Transport and reception of input (lines, tracks, signals, buses etc.) may remain conventional.

As for size and properties with to-day readily available standard mobile phone cameras, a 3 Megapixel color image sensor with 30 frames/s video and optics, the whole in matchtip size, is marketed at reasonable price; and could possibly be adapted/modified for use by this invention, which furthermore does not call for any real change in the established reel mechanical build and parts (although some complex/expensive mechanisms can be substituted) as such, to which it rather offers special advantageous improvements and, much due to the precision of image processing as here applied, also some useful new features.

Since this invention more deals with novel application input subject matter than, although incorporated, with quite conventional output means; and furthermore prefers imaging to distance measuring which latter, like earlier mentioned prior art, just may suit the cast phase, following brief and non-limiting discussion accordingly focuses just on certain here relevant aspects of imaging. It is then seen that the whole fishing cycle (although with emphasis on cast) can be surveyed and assisted by imaging according to the invention. From empty spool (order), through winding on line (slight disorder/entropy), cast (anything between slight to full entropy [chaos][or "order" if line is fully thrown out!]) and winding in (if chaos/"order" was averted; and containing various events/levels of entropy back to slight, when fully wound back). Users input can be supported and furthermore, the degree of assistance may be set by user, but computer can have last word and may also by employing a "self-learning", adaptive routines "personalize" the reel. Entropy can be decided from line state and phase of the fishing cycle.

As in many aspects this invention deals with common imaging means and procedures whereof many possibly applicable variants and versions are available, following non-limiting account of a preferred algorithm ("A"), rather deals with what A will do, than how it precisely does it. With help of image sensor, A can observe whole fishing cycle. At cast, A will monitor tandem (spool-line-bait) run closely to detect early signs of entanglement or increasing entropy on the spool. Once such entropy is sensed, A will track it and try to get back to parity tandem run, by exerting appropriate braking. A will select braking force proportional to present entropy and integrate it with expected entropy; which is not predetermined, but previously evaluated by observing and understanding patterns of line and any irregularities thereto, while winding in before this present cast. If entropy prevailed and gets converted to major entropy, A will supplement with thuds of braking determined on the basis of rate of change of entropy. This intelligent proportional, derivative and integral control subdivision of A depending on spool state and condition of line, has the potential of increasing length of cast for experienced as well as novice anglers, relieving them from tension about entanglement, loss of line etc., end enhancing the overall fishing experience. It should also be here mentioned, that fuzzy rules alternatively can be used for braking control.

The somewhat overlapping, image-understanding segment of A, will detect states of the spool by observing it during static and dynamic events in the fishing cycle. A will process, analyze and understand images of fishing event. It will control image understanding by employing combination of model base control and control by the image data. A will understand static events of fishing cycle (label different segments of image by employing contextual image classification). Before gathering static event image, A will (if provided) adjust focus to get good image at that instant. After the static event understanding, A will allow dynamic event (casting/winding) during which A will carry out recursive image classification and label active line contour, active entropy contour (flawed line; entropy). The active line contours are processed serially. The active entropy contours are processed parallelly. Entropy events are reported to entropy correction A subdivision, for appropriate actions. (Also, fuzzy approximation can be employed to generate entropy events.) After dynamic event is over, A will generate integral control model for next dynamic event.

Figure 2:
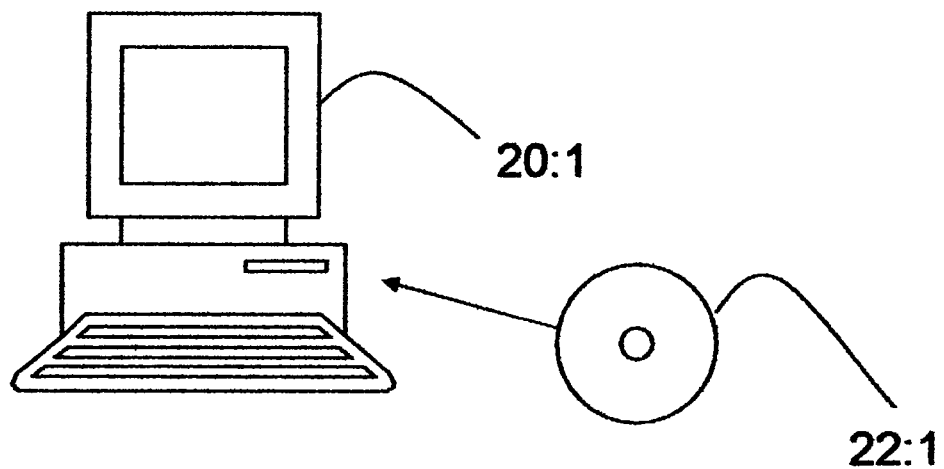
FIG. 2 schematically shows a number of computer software products according to the present invention.
Figure 2:
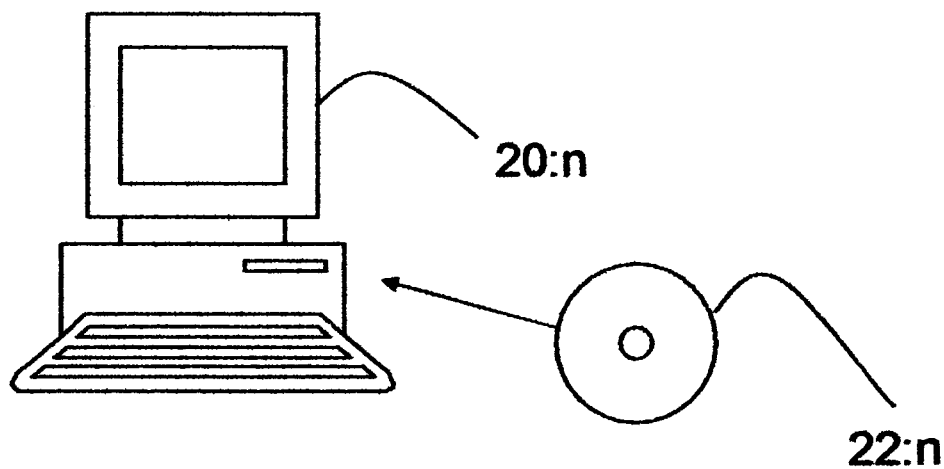

In FIG. 2, some computer software products 22:1, ..., 22:n according to the present invention are schematically shown. In FIG. 2, n different digital computers 20:1, ..., 20:n are shown, where n is an integer. In FIG. 2, n different computer software products 22:1, ..., 22:n are shown, here shown in the form of CD discs. The different computer software products 22:1, ..., 22:n are directly loadable in the internal memory of the n different digital computers 20:1, ..., 20:n. Each computer software product 22:1, ..., 22:n comprises software code portions for executing a part of all the steps according to when the product(s) 22:1, ..., 22:n are run on mentioned computer 20:1, ..., 20:n. The computer software products so 22:1, ..., 22:n may, for instance, be in the form of diskettes, RAM discs, magnetic tapes, magneto-optical discs or some other suitable products.

The invention is not limited to the described embodiments. It will be evident for those skilled in the art that many different modifications are feasible within the scope of the following claims.

This approach of sailing together with angler will avoid chaos and lead to next successful fishing cycle. Relieved from having to concentrate on the spool status, even the once thumb-braker may now lift his eyes and give due attention to the fishing; and the bait on its extendible flight to intended destination.

The invention claimed is:

1. A device for checking rotational velocity or order of a spool with an on-wound line either in case speed mismatch between line and spool occurs when the line is paid out or at least one disorder appears when the line is taken in, said device comprising:
   means for digital imaging, surveying and recording behavior of said line either during pay-out from or taking in on said spool;
   said means reporting in real-time said recording to a computer;
   said computer either generating at least one control signal dynamically dependent on said reported recording or establishing a reference background for a next line pay-out essentially based on information received by said reporting; and
   said computer either by braking controlled by said computer engaging or releasing a brake to rotation of said spool in proportional response to said at least one control signal or by reference to said reference background, warning of or interrupting emergencies.

2. The device according to claim 1, wherein information collected during winding in is utilized for creating the reference background for aiding next pay-out of line.

3. A device for fishing, comprising:
   a casting reel having a frame with a central axis and a horizontal axis;
   a spool mounted in said frame for rotating about said horizontal axis and winding a line around;
   a line behavior sensor having means for digital imaging and electronic distance measuring and said sensor being configured in relation to said line wound around said spool to generate and report a quantity of output signals, said output signals being derived from at least one of recorded images of and recorded distances to said line on or about said spool through either paying out or taking in said line;
   a computer associated with said sensor and configured to receive and compare reported ones of said output signals from said sensor and to generate at least one matching control signal derived from dynamic changes between said output signals; and
   a brake controlled by said computer for engaging or releasing rotation of said spool in proportional response to said at least one control signal.

4. The device according to claim 3 wherein a braking force is engaged or released to counterbalance backlash buildup.

5. The device according to claim 4 wherein the braking force effectuates a dead stop of said spool.

6. The device according to claim 3, wherein said spool is equipped with a spool RPM sensor.

7. The device according to claim 3, wherein said computer is equipped with a user-available computer input for variably regulating rotation velocity of the spool.

8. The device according to claim 3, wherein a user-available computer input is used for varying drag when line is being wound in.

9. The device according to claim 3, wherein at least one element of said brake includes an electrical generator.

10. The device according to claim 9, wherein the electrical generator is effective during winding in or drag.

11. The device according to claim 3, wherein an amount of drag is under control by said computer.

12. The device according to claim 3, wherein a level wind is under control by said computer.

13. The device according to claim 3, wherein personalizing self-learning routines are executed by said computer.

14. The device according to claim 3, wherein said computer is a digital computer.

15. A method for checking rotational velocity or order of a spool with an on-wound line either in case speed mismatch between line and spool occurs when the line is paid out or a disorder appears when the line is taken in, said method comprising the steps of:
   surveying and recording behavior of said line either during pay-out from or taking in on said spool;
   reporting in real-time said recording to a concerned computing means;
   generating at least one control signal dynamically dependent on said reported recording or establishing a reference background for a next line pay-out essentially based on information received by said reporting; and
   engaging or releasing a brake to rotation of said spool in proportional response to said at least one control signal or by reference to said background warning of or interrupting emergencies.

* * * * *

UNITED STATES PATENT AND TRADEMARK OFFICE
CERTIFICATE OF CORRECTION

PATENT NO. : 8,439,290 B2  Page 1 of 1
APPLICATION NO. : 12/448902
DATED : May 14, 2013
INVENTOR(S) : Trell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 917 days.

Signed and Sealed this
Eighth Day of September, 2015

Michelle K. Lee
*Director of the United States Patent and Trademark Office*